United States Patent [19]

Yonemura et al.

[11] Patent Number: 4,981,824

[45] Date of Patent: Jan. 1, 1991

[54] NOVEL CERAMIC MATERIAL, METHOD FOR THE PREPARATION THEREOF AND CERAMIC SHAPED BODY OBTAINED THEREFROM

[75] Inventors: Michiko Yonemura, Ushiku; Tadao Sekine, Tsukuba; Yoshimichi Kiyozumi, Tsukuba; Kunio Suzuki, Tsukuba; Kunio Uchida, Tsukuba; Fumikazu Ikazaki, Tsukuba; Shigemitsu Shin, Tsukuba, all of Japan

[73] Assignee: Director - General of Agency of Industrial Science and Technology, Japan

[21] Appl. No.: 323,826

[22] Filed: Mar. 15, 1989

[30] Foreign Application Priority Data

Jun. 1, 1988 [JP] Japan .................................. 63-134924

[51] Int. Cl.$^5$ ...................... C04B 33/02; C04B 33/10
[52] U.S. Cl. .................................... 501/146; 501/141; 501/149; 501/150
[58] Field of Search ................ 501/146, 141, 149, 150

[56] References Cited

U.S. PATENT DOCUMENTS

| | | | |
|---|---|---|---|
| 2,531,396 | 11/1950 | Carter | 501/146 |
| 3,671,190 | 6/1972 | Neumann | 501/149 |
| 3,816,153 | 6/1974 | Zentz, Jr. | 501/146 |
| 4,001,362 | 1/1977 | Delmon et al. | 264/56 |
| 4,514,510 | 4/1985 | Alexander | 501/146 |
| 4,631,091 | 12/1986 | Goodman | 501/149 |
| 4,786,620 | 11/1988 | Rittler | 501/150 |

OTHER PUBLICATIONS

Clays and Minerals, vol. 28, No. 4, Apr. 1980, "Reaction of Hydroxy-Bismuth Polycations with Montmorillonite".

*Primary Examiner*—William R. Dixon, Jr.
*Assistant Examiner*—Susan E. Hollenbeck
*Attorney, Agent, or Firm*—Lorusso & Loud

[57] ABSTRACT

A novel ceramic material affording a ceramic molded bodies having a high toughness and a high tensile strength is disclosed which comprises a smectite clay mineral having at least a portion of ion-exchangeable cations thereof ion-exchanged with bismuth ions. The ceramic material is prepared by treating a smectite clay mineral with an aqueous solution containing bismuth ions to ion-exchange at least a portion of ion-exchangeable cations thereof with bismuth ions.

20 Claims, No Drawings

NOVEL CERAMIC MATERIAL, METHOD FOR THE PREPARATION THEREOF AND CERAMIC SHAPED BODY OBTAINED THEREFROM

This invention relates to a novel ceramic material suitable for the production of ceramic shaped bodies having a high toughness and a high tensile strength and to a ceramic shaped body obtained therefrom. The present invention is also directed to a method of preparing such a ceramic material.

A smectite clay mineral such as montmorillonite, biderite, saponite is known to give a ceramic shaped body through a series of treatments involving kneading the clay with water, shaping the kneaded clay into a desired form, drying and calcining the shaped green body at a high temperature. The ceramic shaped body thus obtained, however, has a problem because it is low in impact strength and toughness.

Recently, there has been developed a new type of ceramic body generally called a high strength ceramic and obtained by a method including blending super fine particulate such as of alumina with various additives such as sintering aids and binders, molding the blend at a high temperature and a high pressure using a hot press. This technique, however, has a problem because it is very difficult to obtain ceramic shaped bodies with complicated structures.

In accordance with one aspect of the present invention there is provided a ceramic material comprising a smectite clay mineral having at least a portion of ion-exchangeable cations thereof ion-exchanged with bismuth ions.

In another aspect, the present invention provides a method of preparing a ceramic material comprising treating a smectite clay mineral with an aqueous solution containing bismuth ions to ion-exchange at least a portion of ion-exchangeable cations thereof with bismuth ions.

The present invention also provides a process of preparing a shaped ceramic body, comprising the steps of treating a smectite clay mineral with an aqueous solution containing bismuth ions to ion-exchange at least a portion of ion-exchangeable cations thereof with bismuth ions to obtain a ceramic material, shaping the ceramic material, and drying the resulting shaped product.

Since the ceramic material according to the present invention is plastic in nature, it can be easily formed into any desired shapes. When the shaped body of the ceramic material is dried, there is obtainable a ceramic shaped body having a high tensile strength and a high toughness. Such a high tensile strength is considered to be attributed to the presence of structural water contained in the clay mineral. Since the structural water is not lost unless the dried, shaped body is heated at a temperature of below about 800° C., the ceramic shaped body exhibits a high tensile strength at a temperature of below about 800° C. When calcined at a temperature higher than 800° C., the tensile strength of the ceramic shaped body tends to decrease but its compression strength becomes improved.

The present invention will now be described in more detail below.

The ceramic material according to the present invention comprises a smectite clay mineral having at least a portion of ion-exchangeable cations thereof ion-exchanged with bismuth ions. Any smectite clay mineral, such as a montmorillonite, biderite, saponite or hectorite clay mineral may be used for the purpose of the present invention. A naturally occurring smectite clay mineral or a synthetic clay having a structure similar to smectite may be used. To obtain the ceramic material, the smectite mineral is treated with a bismuth ion-containing aqueous solution so that at least a portion of the ion-exchangeable cations of the clay mineral is ion-exchanged with bismuth ions.

The ion-exchange treatment may be effected mixing a raw material clay mineral with an aqueous solution of a bismuth salt. Any water-soluble bismuth salt may be suitably used. Illustrative of suitable bismuth salts are $4BiNO_3(OH)_2 \cdot BiO(OH)$ and bismuth nitrate. The aqueous solution preferably has a bismuth salt concentration of 0.001–0.005 mol/liter, more preferably 0.002–0.004 mol/liter. The bismuth salt is preferably used in an amount of 0.1–0.5 mole, more preferably 0.2–0.4 mole per mole of the smectite clay mineral. The ion-exhange treatment is preferably performed at a temperature of 70°–130° C., more preferably 80°–120° C. After the ion-exchange treatment, the mixture is preferably filtered to remove excess water. The solids are preferably washed with hot water. The thus obtained ceramic material which is plastic in nature can be shaped in any desired forms manually or by means of a suitable shaping machine such as an extruder.

By merely drying the shaped body formed of the ceramic material, a ceramic shaped body having a high tensile strength is obtainable. The drying is generally performed at a temperature of 200° C. or below, preferably at a temperature of 50°–100 ° C. The shaping and drying may be performed simultaneously by means of a hot press or a hot isostatic pressing. The thus obtained ceramic shaped body preferably has a tensile strength of 30–200 kg/cm$^2$, more preferably 80–160 kg/cm$^2$.

If desired, the ceramic shaped body may be further calcined at a temperature of 200°–1300° C. for 1–200 hours to improve the compression strength.

The ceramic shaped body according to the present invention may be prepared at low costs because the clay mineral and bismuth salts to be used as the raw material are easily available at cheap costs and because the process for the production thereof is simple and energy saving. The ceramic shaped body may find a variety of industrial applications such as for the fabrication of ceramic molded articles and catalysts.

The following examples will further illustrate the present invention.

EXAMPLE 1

Basic bismuth nitrate, $4BiNO_3(OH)_2 \cdot BiO(OH)$ (molecular weight, 1,462) (2.92 grams) was added to 1,000 ml of water, and the mixture was heated in an oil bath (110°–120° C.) with stirring to dissolve a virtually whole amount of the bismuth salt. After filtration, 4.0 grams of montmorillonite (natural montmorillonite mined at Atarazawa Kozan; molecular weight, ca. 403; true density, 2.61 kg/cm$^3$, when measured with a density measuring instrument manufactured by Toshiba Beckmann) was added to the bismuth-containing aqueous solution and the mixture was heated for about 1 hour with stirring yielding a pale grayish white precipitate. The precipitate was suction filtered, washed with a hot water, and dried at 80° C.

As the thus prepared bismuth-containing montmorillonite was aggregated so hard that it was crushed with an agate mortar. Then the crushed material was pulverized with an agate pulverizer of electromagnetic type into super fine powder having a particle size of 26 mesh or finer.

A total of six samples of super fine powder (0.9 grams; true density, 3.32 kg/cm$^3$) were molded under a pressure of 400 kg/cm$^2$ for 5 minutes into disk-like bodies (diameter D, about 13 mm; thickness W, about 3 mm; bulk density, 2.75 kg/cm$^3$, measured from weight and volume). All of the molded bodies were subjected to a diametral compression test using a universal tensile compression tester. The tensile strength (St) of each of the molded bodies was computed from the applied pressure (F) and a rupture area (D×W) on the basis of the following formula:

$$St = 2F/(\pi D \times W)$$

The ceramic molded bodies of the bismuth-containing montmorillonite prepared by the above procedures were found to have a high a tensile strength of 99.8 kg/cm$^2$ as a mean value.

EXAMPLE 2

Four different kinds of the bismuth-containing montmorillonite were prepared using varying amounts of the bismuth salt to be added to montmorillonite (molar ratios of basic bismuth nitrate to montmorillonite being 0.1, 0.2, 0.3 and 0.5), and were molded under pressure according to the procedures of Example 1. The molded bodies were then tested for tensile strength.

As a result, groups of several samples having molar ratios of basic bismuth nitrate to montmorillonite of 0.1, 0.2, 0.3 and 0.5 were found to have tensile strengths of 60.7, 90.6, 81.9 and 71.8 kg/cm$^2$, respectively, as mean values.

The above results show that the bismuth-containing montmorillonite gives the highest tensile strength when the molar ratio of the basic bismuth nitrate to montmorillonite is about 0.2.

EXAMPLE 3

Two kinds of bismuth-containing montmorillonite were prepared with varying amounts of the bismuth salt to be added to montmorillonite (molar ratios of the basic bismuth nitrate to montmorillonite being 0.1 and 0.2, respectively) and then molded under pressure in accordance with the procedures of Example 1. The molded bodies were calcined at 600° C. for 4 hours and then tested for tensile strength.

As a result, the two kinds of the molded bodies with bismuth to clay molar ratios of 0.1 and 0.2 were found to have compression strength of 112.0 and 149.4 kg/cm$^2$, respectively as a mean value. Thus, the tensile strength of the ceramic molded bodies was found to increase, rather than deteriorate, by the heat treatment at up to 600° C.

COMPARATIVE EXAMPLE 1

A single composition of montmorillonite, that is, natural montmorillonite (mined at Atarazawa Kozan; about 1 gram) as a sample for test was molded under a pressure of 400 kg/cm$^2$ into 4 samples (bulk density, 2.05 kg/cm$^3$), which were then tested for tensile strength. The tensile strength was found to be 26.4 kg/cm$^2$ as a mean value.

What is claimed is:

1. A shaped ceramic body having a tensile strength of 80-200 Kg/cm$^2$ comprising a smectite clay mineral having at least a portion of ion-exchangeable cations thereof ion-exchanged with bismuth ions, said shaped ceramic body being obtained by a process comprising:
    (a) contacting the smectite clay mineral with an aqueous solution of a bismuth salt at a temperature of 80°-120° C. to ion-exchange at least a portion of ion-exchangeable cations thereof with bismuth ions, said bismuth salt being used in an amount of 0.1-0.5 mole per mole of the smectite clay mineral;
    (b) shaping the ceramic material into a predetermined shape; and
    (c) drying the resulting shaped product.

2. A ceramic material as set forth in claim 1, wherein the smectite clay mineral is selected from montmorillonite, biderite, saponite and hectorite.

3. A ceramic material as set forth in claim 2, wherein said bismuth salt is 4BiNO$_3$(OH)$_2$.BiO(OH) or bismuth nitrate.

4. A ceramic material as set forth in claim 1, wherein said aqueous solution has a bismuth salt concentration of 0.001-0.005 mol/liter.

5. A ceramic material as set forth in claim 1, wherein said treatment is followed by filtration.

6. A shaped ceramic body as set forth in claim 1, wherein said drying is performed at a temperature of not higher than 200° C.

7. A shaped ceramic body as set forth in claim 1, wherein the resulting dried shaped body is further calcined at a temperature of 200°-1300° C. for 1-200 hours.

8. A method of preparing a shaped ceramic body having a tensile strength of 80-200 Kg/cm$^2$, said method comprising:
    (a) treating a smectite clay mineral with an aqueous solution of a bismuth salt at a temperature of 80°-120° C. to ion-exchange at least a portion of ion-exchangeable cations thereof with bismuth ions, said bismuth salt being used in an amount of 0.1-0.5 mole per mole of said smectite clay mineral;
    (b) shaping the ceramic material into a predetermined shape; and
    (c) drying the resulting shaped product.

9. A method as set forth in claim 8, wherein the smectite clay mineral is selected from montmorillonite, biderite, saponite and hectorite.

10. A method as set forth in claim 8, wherein said bismuth salt is 4BiNO$_3$(OH)$_2$.BiO(OH) or bismuth nitrate.

11. A method as set forth in claim 8, wherein said aqueous solution has a bismuth salt concentration of 0.001-0.005 mol.

12. A method as set forth in claim 8, wherein said treatment is followed by filtration.

13. A method as set forth in claim 12, wherein filtration is followed by washing with hot water.

14. A process as set forth in claim 8, wherein said drying is performed at a temperature of not higher than 200° C.

15. A process as set forth in claim 14, wherein the resulting dried shaped body is further calcined at a temperature of 200°-1300° C. for 1-200 hours.

16. A method in accordance with claim 7 wherein said bismuth salt is used in an amount of 0.2-0.4 mole per mole of the smectite clay mineral.

17. The shaped ceramic body of claim 1 produced by said process using said bismuth salt in an amount of 0.2-0.4 mole per mole of the smectite clay mineral.

18. A method in accordance with claim 8 wherein said smectite clay mineral is montmorillonite and the molar ratio of bismuth salt to said montmorillonite is about 0.2.

19. A method in accordance with claim 8 wherein said shaping is molding.

20. A method in accordance with claim 8 wherein said shaping is extrusion.

* * * * *

UNITED STATES PATENT AND TRADEMARK OFFICE
CERTIFICATE OF CORRECTION

PATENT NO. : 4,981,824
DATED : January 1, 1991
INVENTOR(S) : YONEMURA et al

It is certified that error appears in the above-identified patent and that said Letters Patent is hereby corrected as shown below:

Col. 3, line 19, delete "a".

Col. 4, line 12, "claim 2," should read --claim 1,--; and line 55, "claim 7," should read --claim 8--.

Please add the following claim:

--21. A ceramic material as set forth in claim 5 wherein filtration is followed by washing with hot water.--

Signed and Sealed this

Twenty-fifth Day of August, 1992

*Attest:*

DOUGLAS B. COMER

*Attesting Officer*     Acting Commissioner of Patents and Trademarks